United States Patent [19]

Denning

[11] 3,729,900
[45] May 1, 1973

[54] DE-SMOGER
[76] Inventor: William G. Denning, P.O. Box 321, Hudson, Colo. 80642
[22] Filed: Nov. 30, 1970
[21] Appl. No.: 93,653

[52] U.S. Cl. ............55/100, 23/284, 55/234, 55/255, 55/256, 60/297, 60/310
[51] Int. Cl. ..............................B01d 47/02
[58] Field of Search..............55/100, 223, 13, 55/244, 234, 248, 250, 255, 256, 279, 259, 260; 23/2.2 E, 284; 21/74; 60/297, 310

[56] References Cited

UNITED STATES PATENTS

| | | | |
|---|---|---|---|
| 1,032,536 | 7/1912 | Gerli et al. | 23/2 E |
| 1,529,351 | 3/1925 | Grooms | 23/2 E |
| 2,911,289 | 11/1959 | Forry | 23/2 E |
| 3,206,657 | 9/1965 | Moriya | 55/3 |
| 3,340,859 | 9/1967 | Williamson | 55/DIG. 30 |
| 3,566,583 | 3/1971 | Ashmore | 55/DIG. 30 |
| 2,937,710 | 5/1960 | Michael et al. | 55/100 |
| 3,520,113 | 7/1970 | Stokes | 55/256 |

Primary Examiner—Bernard Nozick
Attorney—Reiley and Lewis

[57] ABSTRACT

In apparatus for filtering out objectionable solids and harmful gasses from the exhaust gasses of a combustion engine, a first compartment or chamber containing liquid and through which the exhaust gas passes upwardly so to remove solids such as ash, carbon, soot and the like, a second chamber where neutralizers are introduced to neutralize poisonous gasses passing downwardly, and a third chamber wherein ozone gas can be added and magnetism is incorporated for filtering out metal particles as gasses pass downwardly.

7 Claims, 2 Drawing Figures

Patented May 1, 1973

3,729,900

INVENTOR.
WILLIAM G. DENNING

DE-SMOGER

This invention relates generally to filtering systems and more particularly to novel and improved apparatus for filtering out objectable solids and gasses from exhaust gasses.

A principal object of the present invention is to provide a apparatus which will clean up an exhaust gas from a combustion engine.

Another object of the present invention is to provide a apparatus which can be used on any type of equipment such as air-conditioning or filtering, automotive or on boilers and which can be utilized where any type of fuel is used such as gas, oil or coal.

Another object of the present invention is to provide a apparatus which can be built in a single unit or which alternately can be made in three separate units and which may be in any shape such as square or round so to be fully adaptable for any particular installation.

Other objects of the present invention are to provide a apparatus which is simple in design, inexpensive to manufacture, rugged in construction, easy to use and efficient in operation.

These and other objects will be readily evident by a study of the following specification and the accompanying drawing wherein.

Figure 1:
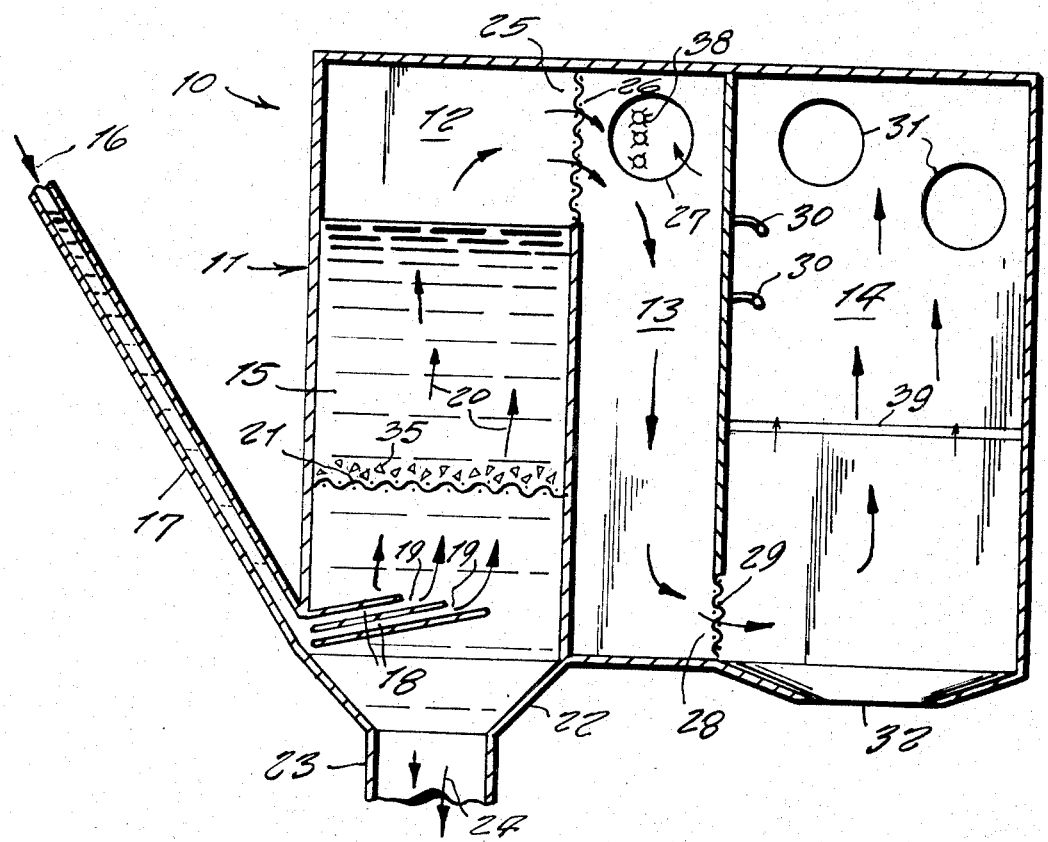
FIG. 1 is a side cross-sectional view of a preferred embodiment of apparatus in accordance with the present invention.
Figure 2:
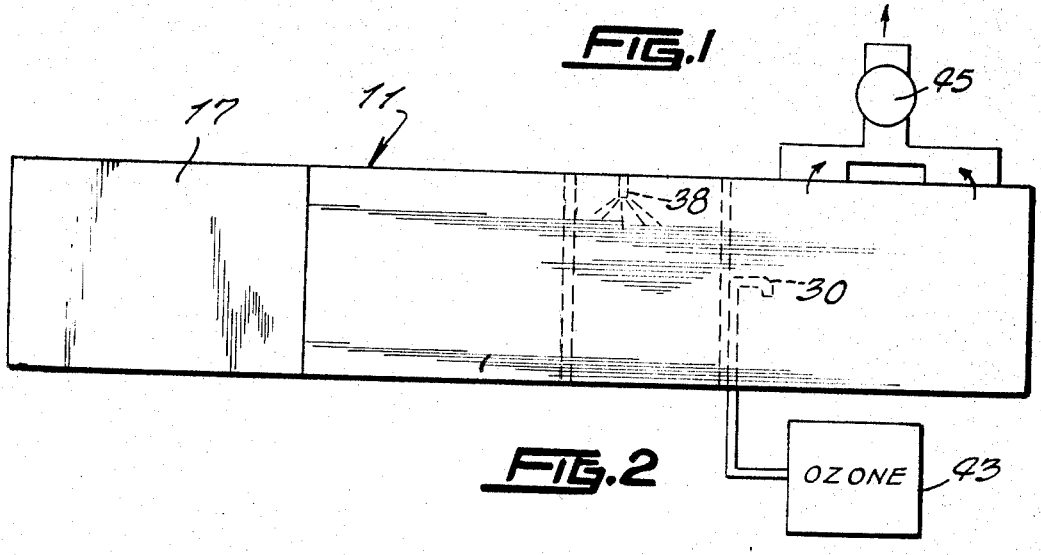
FIG. 2 is a top plan view thereof.

Referring now to the drawing in detail, the reference numeral 10 represents a apparatus made, according to the present invention, wherein there is a tank or housing 11 having the interior thereof divided into three treatment chambers or compartments 12, 13 and 14.

The first compartment 12 has a quantity of liquid 15 placed therewithin and which may comprise any form of solvent for removing ash, carbon, soot or other solid particles from an exhaust gas 16 that is delivered into a lower portion of compartment 12 by a duct or pipe 17. The terminal end of the duct 17 in the lower portion of the compartment 12 is forked with a plurality of channels 18 each one of which has an exit port 19 in a horizontally spaced apart position so that the exhaust gasses are broadcast throughout the liquid 15, as the exhaust gasses bubble upwardly in small particles as indicated by the arrows 20.

A transverse extending screen 21 extends across the compartment 12 and is located within the liquid 15, the rack or screen 21 serving to support chemical nutrients 35 for aiding in the removal of the objectionable solid particles from the exhaust gas. At the lower end of the compartment 12 there is a downwardly extending hopper 22 which converges into a downwardly extending duct 23 and into which sediment 24 comprising the solid particles of ash, carbon or soot are deposited into a sludge sump which can periodically be pumped out. Chemicals deposited into the sludge sump during the process can be then recycled for returning and for subsequent use.

At the upper end of the compartment 12 there is an opening 25 in a side wall covered by a screen 26, the screened opening 25 leading to the compartment 13 and at its upper end thereof. In the compartment 13, the gasses purified from the compartment 12 may now be suitable for energy return to the engine or the fire box if so desired. A port 27 is accordingly provided therefor. The port 27 may additionally be utilized for the addition of neutralizers into the chamber 13 for mixing with the gasses coming from the chamber 12, the nutralizers serving to neutralize any poisonous or harmful gasses. Spray bars or gravity jets 38 may be utilized for mixing the neutralizers with the incoming gasses from the compartment 12. At the lower end of compartment 13 there is an exit opening 28 covered by a screen 29 and which leads to the compartment 14, the gasses thus moving downwardly in the compartment 13 and then moving upwardly in the compartment 14 as indicated by the arrows.

In the compartment 14, an ozone gas from an ozone source 43 may be added by being discharged thereinto from jets 30 coupled to the source 43 and the compartment 14 may include magnetic means 39 for attracting metal particles, thereby removing them from the gas thus traveling upwardly and outwardly through the exhaust ports 31. The exhaust ports 31 are connected by means of ducts 44, to suitable fans 45 which thus cause the exhaust gasses to be circulated through the de-smoger compartments. The lower end of the compartment 14 may be open as shown at 32 or being connected likewise to a suitable sediment collection unit from which the metal particles can then be removed.

Thus there is provided a apparatus which purifies the exhaust gas from a combustion engine that is fired either by gas, oil or coal and wherein the exhaust gas thus purified can then be either recirculated back to the engine or released into the atmosphere without danger of polluting the same.

What I now claim is:

1. In apparatus for filtering out objectionable solids and harmful gasses from exhaust gasses developed by a combustion engine and the like, the combination comprising:

first, second, and third compartments arranged to successively treat exhaust gasses, said first compartment having an inlet at the lower end adapted to receive the exhaust gasses and an outlet at the upper portion communicating with an inlet in the upper portion of second compartment directing the exhaust gasses in an upward direction through the first compartment, said first compartment containing a liquid having a predetermined level for collecting the solids from the exhaust gasses as they are passed upwardly therethrough, said inlet having a forked end portion with a plurality of channels located below the surface of the liquid to broadcast the exhaust gasses upwardly through the liquid, said second compartment having an outlet in a lower portion communicating with an inlet in a lower portion of said third compartment directing the exhaust gasses downwardly through said second compartment and then upwardly through a third compartment and through an outlet in an upper portion of said third compartment, said second compartment having means for introducing a chemical into the gasses passing downwardly therethrough for contact with the gasses, said third compartment having means for spraying ozone into the gasses passing upwardly through said third compartment.

2. In apparatus as set forth in claim 1 including exhaust means coupled to the outlet of said third compartment to move the exhaust gasses through said first, second and third compartments.

3. In apparatus as set forth in claim 1 wherein said first, second, and third compartments are defined by a common tank with intermediate walls.

4. In apparatus as set forth in claim 1 wherein said first compartment has means supporting chemicals for releasing solids from the exhaust gasses as they are passed upwardly therethrough.

5. In apparatus as set forth in claim 1, wherein said third compartment has magnetic means for magnetically removing solids having metallic properties from the gasses passing upwardly through said third compartment.

6. In apparatus as set forth in claim 1 wherein said first and third compartments are each provided with a sediment collection for the removal of solids collected from the exhaust gasses passing therethrough.

7. In apparatus for filtering out objectionable solids including ash, carbon, soot and other particles and harmful gasses including posionous gasses from exhaust gasses developed by a combustion engine and the like, the combination comprising:

a tank having walls arranged to define first, second and third compartments to successively treat the exhaust gasses, said first compartment having an inlet at the lower end coupled to a duct adapted to receive the exhaust gasses and an outlet at an upper portion communicating with an inlet in an upper portion of second compartment directing the exhaust gasses in an upward direction through the first compartment, said duct being forked with a plurality of channels opening into the first compartment said first compartment containing a liquid having a predetermined level for collecting the solids including ash and carbon soot with the surface of the liquid being above said channels and having a rack supporting chemicals above said channels for releasing said solids from the exhaust gasses as they are passed upwardly therethrough, said second compartment having an outlet in a lower portion communicating with an inlet in a lower portion of said third compartment directing the exhaust gasses downwardly through a third compartment, said second compartment having means for introducing a chemical into the gasses passing downwardly therethrough for contact with the gasses, said third compartment having means for spraying an ozone gas into the gasses passing upwardly through said third compartment, and magnetic means for magnetically removing solids having magnetic properties from the gasses, and exhaust for means coupled to the outlet of said third compartment to move the exhaust gasses through said first, second and third compartments.

* * * * *